United States Patent
Han et al.

(10) Patent No.: US 11,942,633 B2
(45) Date of Patent: Mar. 26, 2024

(54) CATHODE OF LITHIUM SECONDARY BATTERY COMPRISING IRON OXIDE, AND LITHIUM SECONDARY BATTERY COMPRISING SAME

(71) Applicant: LG CHEM, LTD., Seoul (KR)

(72) Inventors: Suenghoon Han, Daejeon (KR); Seongji Ye, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 502 days.

(21) Appl. No.: 16/772,981

(22) PCT Filed: Jun. 28, 2019

(86) PCT No.: PCT/KR2019/007845
§ 371 (c)(1),
(2) Date: Jun. 15, 2020

(87) PCT Pub. No.: WO2020/017782
PCT Pub. Date: Jan. 23, 2020

(65) Prior Publication Data
US 2021/0083283 A1    Mar. 18, 2021

(30) Foreign Application Priority Data

Jul. 16, 2018 (KR) .................. 10-2018-0082513

(51) Int. Cl.
*H01M 4/525* (2010.01)
*H01M 4/02* (2006.01)
(Continued)

(52) U.S. Cl.
CPC ........... *H01M 4/525* (2013.01); *H01M 4/131* (2013.01); *H01M 4/133* (2013.01); *H01M 4/134* (2013.01);
(Continued)

(58) Field of Classification Search
CPC ......... H01M 4/131–1397; H01M 4/36; H01M 10/0525; H01M 10/4235; H01M 2004/021; H01M 2004/028
See application file for complete search history.

(56) References Cited

U.S. PATENT DOCUMENTS

| 5,480,570 A | 1/1996 | van Bonn et al. |
| 2004/0091776 A1 | 5/2004 | Hwang |

(Continued)

FOREIGN PATENT DOCUMENTS

| CN | 102683659 A | 9/2012 |
| CN | 103730664 A | 4/2014 |

(Continued)

OTHER PUBLICATIONS

Xiulei Ji, A highly ordered d nanostructured carbon-sulphur cathode for lithium-sulphur batteries, May 17, 2009, Nature Materials, vol. 8, 500-506 (Year: 2009).*

(Continued)

*Primary Examiner* — Ula C Ruddock
*Assistant Examiner* — Armindo Carvalho, Jr.
(74) *Attorney, Agent, or Firm* — Birch, Stewart, Kolasch & Birch, LLP (57) ABSTRACT

A positive electrode of a lithium secondary battery including an iron oxide as an additive, and a lithium secondary battery including the positive electrode. In the case of a lithium secondary battery including a positive electrode to which iron oxide is applied, the iron oxide adsorbs the lithium polysulfide (LiPS) generated in the charging/discharging process of the lithium secondary battery, thereby exhibiting an effect of increasing the charging/discharging efficiency of the battery and improving the lifetime characteristics.

11 Claims, 6 Drawing Sheets

(51) Int. Cl.
  *H01M 4/131* (2010.01)
  *H01M 4/133* (2010.01)
  *H01M 4/134* (2010.01)
  *H01M 4/62* (2006.01)
  *H01M 4/66* (2006.01)
  *H01M 10/0525* (2010.01)

(52) U.S. Cl.
  CPC ........... *H01M 4/621* (2013.01); *H01M 4/661* (2013.01); *H01M 10/0525* (2013.01); *H01M 2004/021* (2013.01); *H01M 2004/028* (2013.01)

(56) References Cited

U.S. PATENT DOCUMENTS

| | | |
|---|---|---|
| 2014/0260803 A1 | 9/2014 | Zendejas-Martinez |
| 2014/0361226 A1 | 12/2014 | Takada et al. |
| 2018/0138503 A1 | 5/2018 | Kim et al. |

FOREIGN PATENT DOCUMENTS

| | | | | |
|---|---|---|---|---|
| CN | 104577080 A | | 4/2015 | |
| CN | 106058150 A | * | 10/2016 | ............... H01M 4/13 |
| CN | 106129375 A | | 11/2016 | |
| CN | 108450197 A | | 2/2017 | |
| CN | 108063224 A | | 5/2018 | |
| JP | 6-89015 A | | 3/1994 | |
| JP | 2004-6301 A | | 1/2004 | |
| JP | 2004-152743 A | | 5/2004 | |
| JP | 2009-292704 A | | 12/2009 | |
| JP | 2012-94361 A | | 5/2012 | |
| JP | 2013-54957 A | | 3/2013 | |
| KR | 10-0270077 B1 | | 10/2000 | |
| KR | 10-1157882 B1 | | 6/2012 | |
| KR | 10-2013-0108865 A | | 10/2013 | |
| KR | 10-2014-0054314 A | | 5/2014 | |
| KR | 10-2014-0116397 A | | 10/2014 | |
| KR | 10-2017-0001374 A | | 1/2017 | |
| KR | 10-2017-0032190 A | | 3/2017 | |
| KR | 10-1822411 B1 | | 1/2018 | |
| KR | 10-2018-0020073 A | | 2/2018 | |
| WO | WO 2012/098960 A1 | | 7/2012 | |
| WO | WO 2013/035274 A1 | | 3/2013 | |
| WO | WO-2016134765 A1 | * | 9/2016 | ............ C01B 13/36 |
| WO | WO 2019/198949 A1 | | 10/2019 | |
| WO | WO 2020/013488 A1 | | 1/2020 | |

OTHER PUBLICATIONS

KR101157882B English machine translation (Year: 2022).*
CN106058150A English machine translation (Year: 2022).*
Zhao et al., "Prussian blue-derived Fe2O3/sulfur composite cathode for lithium-sulfur batteries," Materials Letters, vol. 137, 2014 (Sep. 1, 2014), pp. 52-55.
Extended European Search Report for European Application No. 19837580.0. dated Mar. 17, 2021.
Abbasi et al., "Synthesis, characterization and electrochemical performances of y-Fe2O3 cathode material for Li-ion batteries," Journal of Materials Science: Materials in Electronics, vol. 27, 2016, pp. 7953-7961.
Bourlinos et al., "One-pot Borohydride Synthesis of Magnetically Modified Lepidocrocite," Chemistry Letters vol. 34, No. 5, 2005, pp. 666-667.
Hibino et al., "Reversible and Rapid Discharge-Charge Performance of y-Fe2O3 Prepared by Aqueous Solution Method as the Cathode for Lithium-Ion Battery," Journal of The Electrochemical Society, vol. 154, No. 12, 2007, pp. A1107-A1111.
International Search Report (PCT/ISA/210) Issued in PCT/KR2019/007845, dated Oct. 1, 2019.
Jia et al., "Facile one-pot synthesis of lepidocrocite (y-FeOOH) nanoflakes for water treatment," New J. Chem., vol. 37, 2013, pp. 2551-2556.
Melnikov et al., "Thermal decomposition mechanism of iron(III) nitrate and characterization of intermediate products by the technique of computerized modeling," J. Therm. Anal. Calorim., vol. 115, 2014, pp. 145-151.
Tuček et al., "Iron-Oxide-Supported Nanocarbon in Lithium-Ion Batteries, Medical, Catalytic, and Environmental Applications," American Chemical Society, vol. 8, No. 8, 2014, pp. 7571-7612.
Wieczorek-Ciurowa et al., "The Thermal Decomposition of Fe(No3)3•9H2O," Journal of Thermal Analysis and Calorimetry, vol. 58, 1999, pp. 647-651.

* cited by examiner

CATHODE OF LITHIUM SECONDARY BATTERY COMPRISING IRON OXIDE, AND LITHIUM SECONDARY BATTERY COMPRISING SAME

TECHNICAL FIELD

This application claims the benefit of priority based on Korean Patent Application No. 10-2018-0082513, filed on Jul. 16, 2018, the entire contents of which are incorporated herein by reference.

The present invention relates to a positive electrode for a lithium secondary battery comprising an iron oxide as a positive electrode additive, and a lithium secondary battery with improved discharging characteristic comprising the same.

BACKGROUND ART

Secondary batteries have become important electronic components for portable electronic devices since the 1990s as an electric storage device capable of continuous charging and discharging unlike the primary battery which can only be discharged once. In particular, since a lithium ion secondary battery was commercialized by Sony in Japan in 1992, it has led the information age as a key component of portable electronic devices such as smart phones, digital cameras, and notebook computers.

In recent years, lithium ion secondary batteries are rapidly growing in demand from electric sources of cleaner and power tool, medium-sized batteries to be used in fields such as electric bicycles and electric scooters, to large capacity batteries for applications such as electric vehicle (EV), hybrid electric vehicle (HEV), plug-in hybrid electric vehicle (PHEV), and various robots and electric power storage systems (ESS), while further widening application area.

However, the lithium secondary battery, which has the best characteristics among the secondary batteries known to date, also has several problems in being actively used in transportation vehicles such as electric vehicles and PHEVs, and among them, the biggest problem is the limit in capacity.

The lithium secondary battery basically consists of materials such as positive electrode, electrolyte, and negative electrode. Among them, since the capacity of the battery is determined by the positive and negative electrode materials, the lithium ion secondary battery is limited in capacity due to the material limitations of positive and negative electrodes. In particular, since the secondary battery used in applications such as electric vehicles and PHEVs should be able to last as long as possible after charging once, the discharging capacity of the secondary battery is very important. One of the biggest constraints to the sale of electric vehicles is that the distance that can be traveled after charging once is much shorter than those of ordinary gasoline engine vehicles.

The limitation of the capacity of such a lithium secondary battery is difficult to be completely solved due to the structure and material constraints of the lithium secondary battery despite of much effort. Therefore, in order to fundamentally solve the problem of the capacity of the lithium secondary battery, it is required to develop a new concept secondary battery that goes beyond the existing secondary battery concept.

The lithium-sulfur battery is a new high capacity and low-cost battery system which goes beyond capacity limits determined by the intercalation/deintercalation reaction of lithium ions to the layered structure of the metal oxide and graphite which is the basic principle of existing lithium ion secondary battery, and which can lead to replacement of transition metals and cost savings.

The lithium-sulfur battery has a theoretical capacity of 1,675 mAh/g derived from a conversion reaction of lithium ion and sulfur ($S_8+16Li^++16e^-\rightarrow 8Li_2S$) in the positive electrode and the negative electrode enables the battery system to have very high capacity using lithium metal (theoretical capacity: 3,860 mAh/g). Also, since the discharging voltage is about 2.2 V, the theoretical energy density is 2,600 Wh/kg based on the amount of the positive electrode and the negative electrode active material. These values are 6 to 7 times higher than the theoretical energy density of 400 Wh/kg of commercially available lithium secondary battery ($LiCoO_2$/graphite) which uses layered metal oxides and graphite.

After the lithium-sulfur battery was found to be able to dramatically improve battery performance through the formation of nanocomposites around 2010, the lithium-sulfur secondary battery is attracting attention as a new high capacity, eco-friendly, low-cost lithium secondary battery and is currently being studied intensively around the world as a next-generation battery system.

One of the main problems of the lithium-sulfur secondary battery revealed to date is that since sulfur has an electrical conductivity of about $5.0\times 10^{-14}$ S/cm and thus is close to nonconductor, electrochemical reaction at the electrode is not easy, and due to the very large overvoltage, the actual discharging capacity and voltage are far below the theoretical value. Early researchers tried to improve the performance by methods such as mechanical ball-milling of sulfur and carbon or surface coating with carbon, but there was no substantial effect.

In order to effectively solve the problem of limiting the electrochemical reaction by electrical conductivity, it is necessary to reduce the particle size to a size of several tens of nanometers or less and to conduct surface treatment with an electrically conductive material, as in the example of $LiFePO_4$ (electrical conductivity: $10^{-9}$ to $10^{-10}$ S/cm) which is one of the other positive electrode active materials, and for this purpose, various chemical (melt impregnation into nano-sized porous carbon nanostructures or metal oxide structures) and physical (high energy ball milling) methods and the like have been reported.

Another major problem associated with the lithium-sulfur secondary battery is the dissolution of lithium polysulfide into the electrolyte, which is the intermediate product of sulfur generated during discharging. As the discharging is proceeded, sulfur ($S_8$) continuously reacts with lithium ions and thus the phases thereof are continuously changed into $S_8\rightarrow Li_2S_8\rightarrow(Li_2S_6)\rightarrow Li_2S_4\rightarrow Li_2S_2\rightarrow Li_2S$ or the like, and among them, $Li_2S_8$ and $Li_2S_4$ (lithium polysulfide), which are long chains of sulfur, are easily dissolved in a general electrolyte used in a lithium ion battery. When this reaction occurs, not only the reversible positive electrode capacity is greatly reduced but also the dissolved lithium polysulfide diffuses into the negative electrode and causes various side reactions.

The lithium polysulfide causes a shuttle reaction especially during the charging process, and as a result, the charging capacity is continuously increased, and the charging/discharging efficiency is rapidly deteriorated. Recently, in order to solve such a problem, various methods have been proposed, which can be divided broadly into a method of improving the electrolyte, a method of improving the surface of a negative electrode, a method of improving the properties of a positive electrode and the like.

The method of improving the electrolyte is a method to suppress the shuttle reaction as much as possible by using new electrolytes, such as a functional liquid electrolyte, a polymer electrolyte, and an ionic liquid, which have a novel composition, and thus controlling the dissolution of the polysulfide into the electrolyte or controlling the dispersion rate to the negative electrode through adjustment of the viscosity and the like.

Studies on controlling the shuttle reaction by improving the characteristics of SEI formed on the surface of the negative electrode have been actively carried out. Typically, there is a method of adding an electrolyte additive such as $LiNO_3$ to form an oxide film of $Li_xNO_y$ or $Li_xSO_y$ on the surface of a lithium negative electrode, a method of forming a thick functional SEI layer on the surface of lithium metal, or the like.

Finally, as a method of improving the properties of a positive electrode, there is a method of forming a coating layer on the surfaces of positive electrode particles so as to prevent dissolution of the polysulfide, adding a porous material capable of catching the dissolved polysulfide or the like. Typically, a method of coating the surface of a positive electrode structure containing a sulfur particle with a conductive polymer, a method of coating the surface of a positive electrode structure with a metal oxide through which lithium ions are transferred, a method of adding a porous metal oxide, which has a large specific surface area and a large pore size and is capable of absorbing a large amount of the lithium polysulfide, to a positive electrode, a method of attaching a functional group capable of adsorbing the lithium polysulfide to the surface of a carbon structure, a method of wrapping sulfur particles by using graphene, graphene oxide or the like have been proposed.

Although such efforts are under way, these methods are not only somewhat complicated, but also have a problem that the amount of sulfur that can be added, which is an active material, is limited. Therefore, it is necessary to develop new technologies to solve these problems complexly and to improve the performance of lithium-sulfur battery.

DISCLOSURE

Technical Problem

Therefore, in order to solve the problem of leaching of the lithium polysulfide occurring on the positive electrode side of the lithium-sulfur battery, which is one embodiment of the lithium secondary battery, and to inhibit the side reaction with the electrolyte solution, the inventors of the present invention have introduced an iron oxide having specific oxidation number into the positive electrode of the battery, and as a result, it has been confirmed that the battery performance of the lithium secondary battery can be improved by solving the above problem, thereby completing the present invention.

Therefore, it is an object of the present invention to provide a positive electrode additive for the lithium secondary battery capable of solving the problem caused by the lithium polysulfide.

Also, it is other object of the present invention to provide a lithium secondary battery comprising the positive electrode and thus having improved lifetime characteristic of the battery.

Technical Solution

In order to achieve the above objects, the present invention provides a positive electrode for a lithium secondary battery comprising an active material, an electrically conductive material, a binder, and an iron oxide represented by the following Formula 1:

$Fe_xO_3$(wherein 1.7≤x<2). [Formula 1]

In one embodiment of the present invention, the content of the iron oxide is 0.1 to 15 parts by weight based on 100 parts by weight of the base solid material including the active material, the electrically conductive material and the binder, contained in the positive electrode of the lithium secondary battery.

In one embodiment of the present invention, the iron oxide is in the form of secondary particles formed by agglomeration of primary particles.

In one embodiment of the present invention, the primary particles have a particle diameter of 10 nm to 80 nm.

In one embodiment of the present invention, the secondary particles have a particle diameter of 1 μm to 5 μm.

In one embodiment of the present invention, the iron oxide is crystalline.

In one embodiment of the present invention, the iron oxide has X-ray diffraction (XRD) peaks appearing at 2θ=24.2±0.1°, 33.8±0.1°, 36.0±0.1°, 40.8±0.1°, 49.4±0.1°, and 53.8±0.1°, respectively.

In one embodiment of the present invention, the active material includes a sulfur-carbon composite.

In one embodiment of the present invention, the sulfur-carbon composite has a sulfur content of 60 parts by weight to 90 parts by weight based on 100 parts by weight of the sulfur-carbon composite.

In one embodiment of the present invention, the positive electrode includes a current collector and an electrode active material layer formed on at least one side of the current collector, wherein the electrode active material layer includes the active material, the electrically conductive material, the binder, and the iron oxide, and a porosity of the electrode active material layer is 60% to 75%.

In addition, the present invention provides a lithium secondary battery including the above-described positive electrode; the negative electrode; the separator interposed therebetween; and the electrolyte.

Advantageous Effects

If the iron oxide according to the present invention is applied to the positive electrode of the lithium secondary battery, it is possible to increase the reactivity of the positive electrode of the lithium secondary battery and suppress the side reaction with the electrolyte solution by adsorbing the lithium polysulfide generated during charging/discharging of the lithium secondary battery.

The lithium secondary battery comprising the positive electrode containing the iron oxide is capable of realizing a battery with high capacity because the capacity of sulfur is not lowered, and stably applying sulfur with high loading, thereby also improving the stability of the battery because the overvoltage of the battery is improved and there is no problem such as the short circuit and heat generation of the battery. In addition, the lithium secondary battery has an advantage that the charging/discharging efficiency of the battery is high and the lifetime characteristics are improved.

BEST MODE

Hereinafter, the present invention will be described in detail with reference to the accompanying drawings so that those skilled in the art can easily carry out the present invention. However, the present invention can be embodied in various different forms, and is not limited thereto.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The term "composite" as used herein refers to a material that two or more materials are combined to express a more effective function while forming physically and chemically different phases to each other.

The lithium secondary battery is manufactured by using a material capable of intercalating/deintercalating lithium ions as a negative electrode and a positive electrode, and filling an organic electrolyte solution or a polymer electrolyte solution between the negative electrode and the positive electrode, and means an electrochemical device that generates electrical energy by the oxidation/reduction reaction when lithium ions are intercalated and deintercalated at positive and negative electrodes. According to an embodiment of the present invention, the lithium secondary battery may be a lithium-sulfur battery comprising "sulfur" as an electrode active material of the positive electrode.

The present invention provides a positive electrode for a lithium secondary battery, which is improved in the problem of the continuous deterioration of the reactivity of the electrode, the problem of the reduction of the discharging capacity and the like due to the dissolution and shuttle phenomenon of the lithium polysulfide by complementing the disadvantages of the conventional positive electrode for the lithium secondary battery.

Specifically, the positive electrode for the lithium secondary battery according to the present invention is characterized by further comprising an iron oxide represented by the following Formula 1 as a positive electrode additive while comprising an active material, an electrically conductive material, and a binder:

$$Fe_xO_3 \text{(wherein } 1.7 \leq x < 2\text{)}. \quad \text{[Formula 1]}$$

In particular, the iron oxide is contained in the positive electrode for the lithium secondary battery in the present invention to adsorb the lithium polysulfide, thereby being capable of reducing the problem that the lithium polysulfide is transferred to the negative electrode and thus reduce the lifetime of the lithium secondary battery, and to inhibit the decrease in reactivity due to the lithium polysulfide, thereby increasing the discharging capacity of the lithium secondary battery comprising the positive electrode and improving the lifetime of the battery.

Method for Preparing Iron Oxide

The method for preparing the iron oxide according to the present invention may comprise the steps of:

(1) dissolving $Fe(NO_3)_3 \cdot 9H_2O$ in distilled water to prepare an aqueous $Fe(NO_3)_3 \cdot 9H_2O$ solution;

(2) drying the aqueous $Fe(NO_3)_3 \cdot 9H_2O$ solution; and (3) heat-treating the dried $Fe(NO_3)_3 \cdot 9H_2O$ to obtain an iron oxide represented by the following Formula 1:

$$Fe_xO_3 \text{(wherein } 1.7 \leq x < 2\text{)}. \quad \text{[Formula 1]}$$

The $Fe(NO_3)_3 \cdot 9H_2O$ may be dissolved in an aqueous solvent to prepare an aqueous solution, and preferably, $Fe(NO_3)_3 \cdot 9H_2O$ may be dissolved in deionized water (DIW) or the like. The concentration of the aqueous solution may be 0.5 to 5.0 M, preferably 1.0 to 2.0 M. If the concentration of the aqueous solution is less than 0.5 M, the evaporation rate of the aqueous solution becomes slow, and thus the crystal of the iron oxide prepared may become large or the preparation yield of the iron oxide may be lowered. If the concentration of the aqueous solution is more than 5.0 M, the iron oxide prepared may be agglomerated and the physical properties of the iron oxide may not be suitable for application as a positive electrode additive for a lithium secondary battery.

The aqueous $Fe(NO_3)_3 \cdot 9H_2O$ solution may be further subjected to a pre-treatment step for drying before the heat treatment for preparing the iron oxide. The drying can be carried out at 70 to 90° C., preferably at 75 to 85° C. Also, the drying can be carried out for 4 to 12 hours at the above temperature range, preferably for 5 to 8 hours. If the temperature is less than the above-mentioned temperature or the drying time is short, the moisture of the reactant $Fe(NO_3)_3 \cdot 9H_2O$ may remain excessively, and then the moisture may be evaporated non-uniformly through the heat treatment process, so that the iron oxide represented by the above Formula 1 according to the present invention may not be synthesized. Also, if the temperature exceeds the above-mentioned range or the drying time is long, after the moisture of the reactant $Fe(NO_3)_3 \cdot 9H_2O$ is completely evaporated, the oxidation reaction by the heat treatment can be partially progressed. In this case, the non-uniform oxidation reaction may occur through the heat treatment process, and the material represented by the above Formula 1 may not be synthesized. Therefore, it is appropriately adjusted within the above range. The pre-treatment step for drying may be carried out using a convection oven in an environment where sufficient air is introduced.

The $Fe(NO_3)_3 \cdot 9H_2O$ may be subjected to a pre-treatment for drying and then heat-treated to produce the iron oxide represented by the above Formula 1. The heat treatment may be performed at 120 to 170° C., preferably at 150 to 160° C.

In addition, the heat treatment may be performed for 16 to 36 hours, preferably for 18 to 24 hours at the above-mentioned temperature range. If the heat treatment temperature is less than 120° C. or the heat treatment time is shorter than the above-mentioned heat treatment time, the reaction cannot be terminated and reactive residues such as $Fe(OH)_2NO_3$ and the like, which are not the structure of the above Formula 1, may be remained. Also, if the heat treatment temperature exceeds 170° C. or the heat treatment time is longer than the above-mentioned heat treatment time, the generated particles can be expressed in a large size and in an agglomerated shape, and stable substances such as $Fe_2O_3$ can be produced unlike the iron oxide represented by the Formula 1. Therefore, since it may be difficult to synthesize the iron oxide having the desired physical properties according to the present invention, the treatment temperature and time are appropriately adjusted within the above range of temperature and time. The heat treatment step may be carried out using a convection oven in an environment where sufficient air is introduced.

The $Fe(NO_3)_3 \cdot 9H_2O$ releases $HNO_3$ (g) through the heat treatment step to produce a material represented by the above Formula 1. The oxidation number of the iron in Formula 1 may have various oxidation numbers depending on the heat treatment time and temperature. Preferably, x is 1.7≤x<1.9, more preferably 1.7≤x<1.8, and according to a preferred embodiment of the present invention, x=1.766 in Formula 1.

The iron oxide prepared may form secondary particles by agglomeration of the primary particles. At this time, the primary particles may have a particle diameter of 10 to 80 nm, and preferably 20 to 50 nm. The secondary particles formed by agglomeration of the primary particles may have a particle diameter of 1 to 5 μm, preferably 2 to 3 μm. As the particle diameter of the secondary particles decreases within the above range, it is suitable as a positive electrode material of a lithium secondary battery. If the particle diameter of the secondary particles is larger than the above range, the particle size may be too large to be suitable as a positive electrode additive for a lithium secondary battery.

If the iron oxide prepared by the above-described method for preparing iron oxide is applied to a lithium secondary battery, it is possible to adsorb the lithium polysulfide leached when the lithium secondary battery is charged/discharged, thereby improving the performance of the lithium secondary battery.

The iron oxide prepared by the above reaction may be crystalline.

Figure 1:
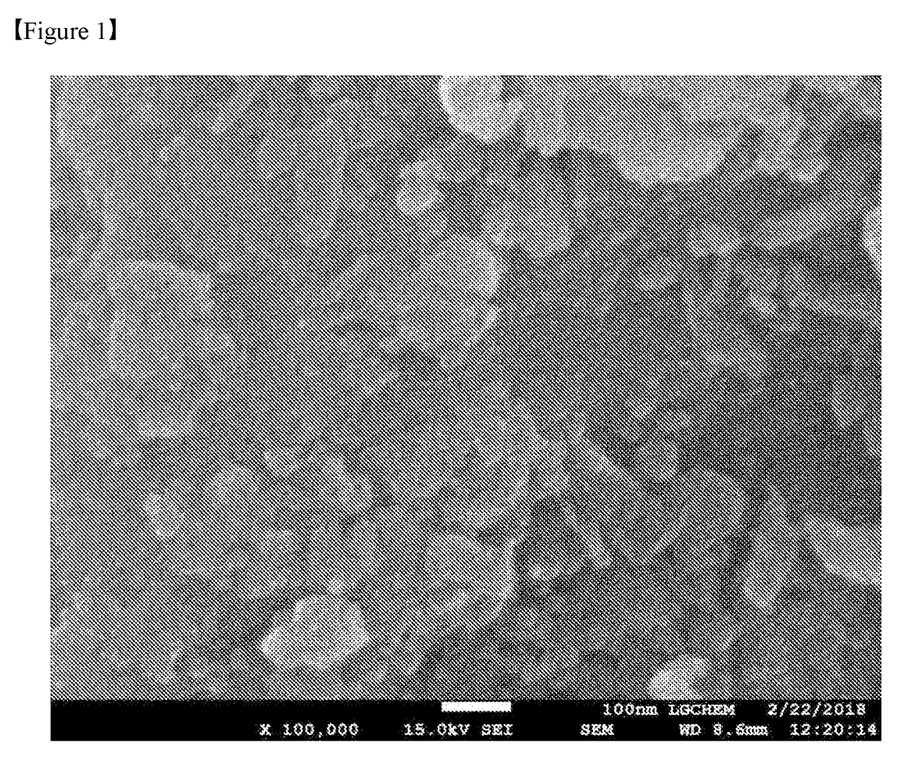
FIG. 1 shows a scanning electron microscope (SEM) image of iron oxide ($Fe_{1.766}O_3$) according to Preparation Example 1 of the present invention.
Figure 2:
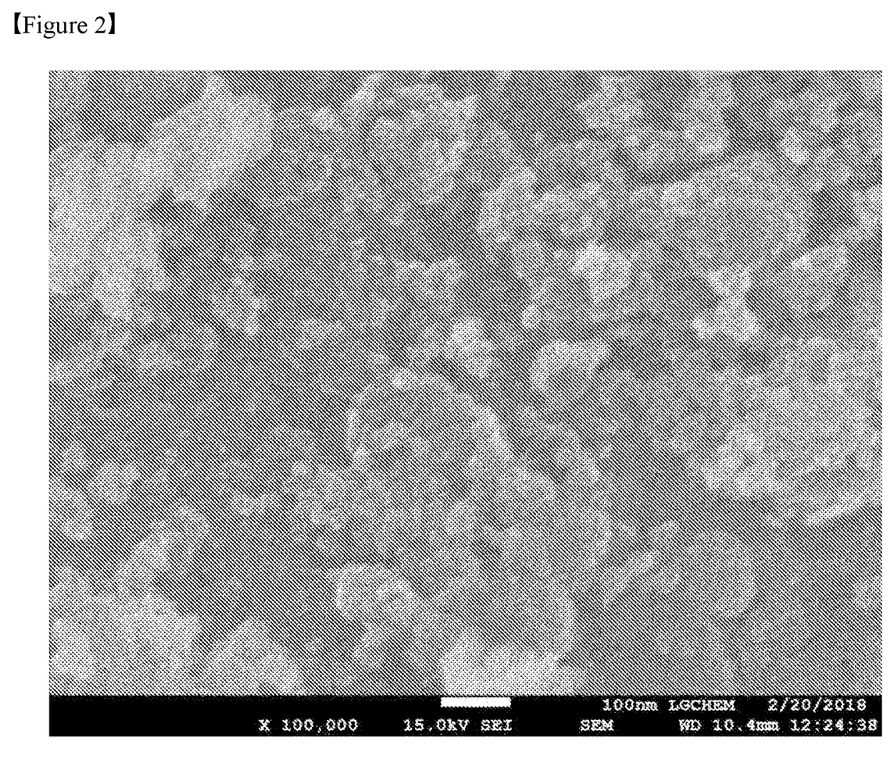
FIG. 2 shows a scanning electron microscope (SEM) image of iron oxide ($Fe_{1.766}O_3$) according to Preparation Example 2 of the present invention.

FIGS. 1 and 2 show scanning electron microscope (SEM) images of iron oxides according to Preparation Examples 1 and 2 prepared by the above preparation method. In FIG. 1, the iron oxide prepared according to the method of the present invention can be confirmed.

Figure 3:
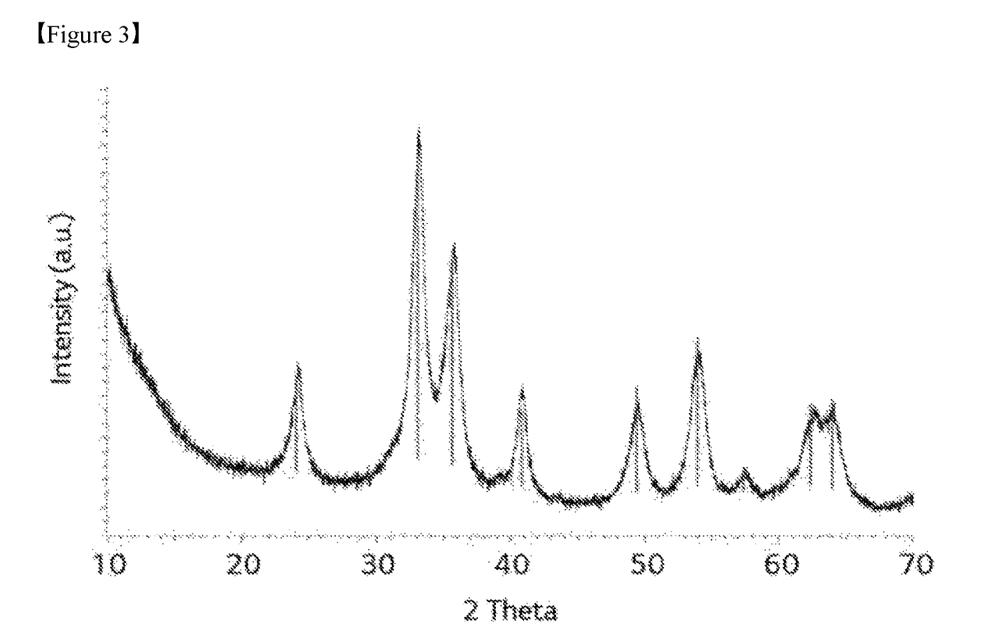
FIG. 3 shows X-ray diffraction (XRD) results of iron oxide ($Fe_{1.766}O_3$) according to Preparation Example 1 of the present invention.
Figure 4:
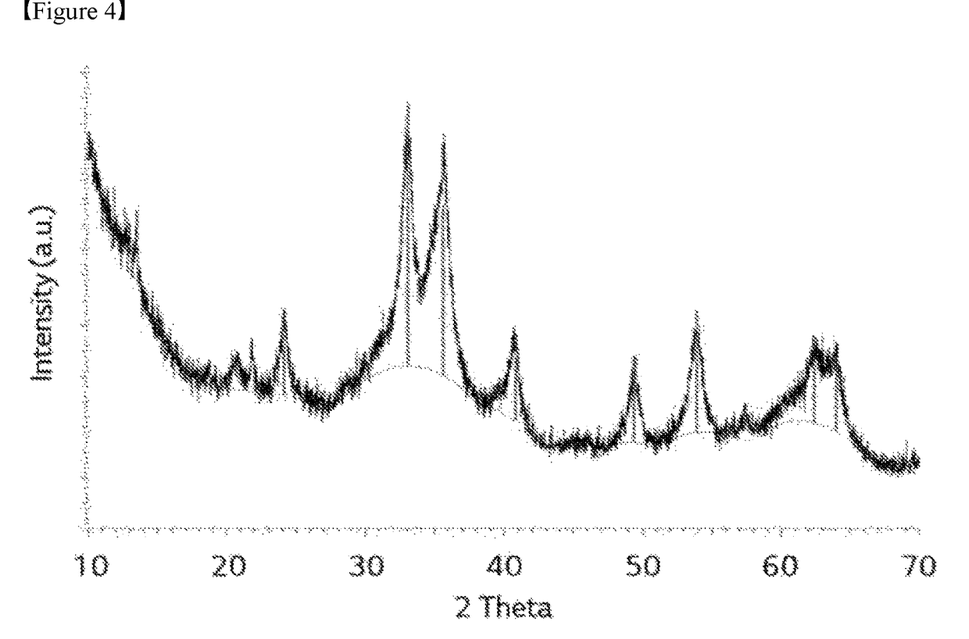
FIG. 4 shows X-ray diffraction (XRD) results of iron oxide ($Fe_{1.766}O_3$) according to Preparation Example 2 of the present invention.

FIGS. 3 and 4 show the results of X-ray diffraction (XRD) data of the iron oxide produced by the above production method. As a result of X-ray diffraction analysis using the CuKα ray shown in FIGS. 3 and 4, the XRD peaks appeared at 2θ=24.2±0.1°, 33.8±0.1°, 36.0±0.1°, 40.8±0.1°, 49.4±0.1°, and 53.8±0.1°, respectively. It can be confirmed through the detection of the effective peaks in FIGS. 3 and 4 that the iron oxide according to the present invention was synthesized.

The significant or effective peak in X-ray diffraction (XRD) refers to a peak that is repeatedly detected in substantially the same pattern without being significantly affected by the analysis conditions or analysts in the XRD data, and in other words, refers to a peak having a height, strength, intensity or the like of at least 1.5 times, preferably at least 2 times, and more preferably at least 2.5 times the background level.

Positive Electrode for Lithium Secondary Battery

One embodiment of the lithium secondary battery according to the present invention may be a lithium-sulfur battery comprising a positive electrode containing sulfur as an electrode active material.

The present invention provides a positive electrode for a lithium secondary battery comprising an active material, an electrically conductive material, and a binder, wherein the positive electrode comprises an iron oxide represented by the following Formula 1:

$$Fe_xO_3 \text{(wherein } 1.7 \leq x < 2\text{)}. \quad \text{[Formula 1]}$$

At this time, the positive electrode for the lithium secondary battery may comprise a current collector and an electrode active material layer formed on at least one side of the current collector, and the electrode active material layer may comprise a base solid material containing an active material, an electrically conductive material, and a binder.

As the current collector, it is preferable to use aluminum, nickel or the like having excellent conductivity.

In one embodiment, the iron oxide represented by the above Formula 1 may be contained in an amount of 0.1 to 15 parts by weight, specifically, 1 to 10 parts by weight, preferably 5 to 10 parts by weight based on 100 parts by weight of the base solid material containing the active material, the electrically conductive material, and the binder. If the content is less than the lower limit value of the above-mentioned numerical range, the adsorption effect for the polysulfide may be insignificant. If the content exceeds the upper limit value, the energy density of the battery is reduced and thus the capacity of the electrode can be reduced, which are not preferable. As an iron oxide, the iron oxide prepared by the present invention can be used.

The active material in the base solid material constituting the positive electrode of the present invention may comprise elemental sulfur ($S_8$), a sulfur-based compound, or a mixture thereof, and the sulfur-based compound may specifically be $Li_2S_n(n \geq 1)$, an organic sulfur compound or a carbon-sulfur polymer $((C_2S_x)_n: x=2.5 \text{ to } 50, n \geq 2)$.

The positive electrode for the lithium secondary battery according to the present invention may preferably comprise an active material of sulfur-carbon composite, and sulfur alone is not electrically conductive and thus can be used in combination with an electrically conductive material. The addition of the iron oxide according to the present invention does not affect the maintenance of this sulfur-carbon composite structure.

In one embodiment, the sulfur-carbon composite may contain 60 to 90 parts by weight of sulfur, specifically, 65 to 85 parts by weight of sulfur, preferably 70 to 80 parts by weight of sulfur, based on 100 parts by weight of the sulfur-carbon composite. If the sulfur content is less than 60 parts by weight, the content of the carbon material of the sulfur-carbon composite relatively increases, and the specific surface area increases with the increase of the carbon content, and thus when preparing the slurry, the addition amount of the binder must be increased. The increase in the addition amount of the binder may eventually increase the sheet resistance of the electrode, and thus may act as an insulator to prevent electron pass, thereby deteriorating the performance of the battery. If the sulfur content exceeds 90 parts by weight, sulfur or sulfur compounds that are not associated with the carbon material agglomerate with each other or are re-leached to the surface of the carbon material, and thus may be difficult to receive electrons, thereby being difficult to participate directly in electrode reactions. Therefore, the sulfur content is properly adjusted within the above range.

The carbon of the sulfur-carbon composite according to the present invention may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and activated carbon, and its shape can be used without restriction as long as it is commonly used in the lithium secondary battery in the form of sphere, rod, needle, plate, tube, or bulk.

The active material may be preferably used in an amount of 50 to 95 parts by weight, more preferably about 70 parts by weight, based on 100 parts by weight of the base solid material. If the active material is comprised in an amount less than the above range, the reaction of the electrode is difficult to be sufficiently exerted. Even if the active material is comprised in an amount more than the above range, the content of other electrically conductive materials and binders is relatively insufficient and it is difficult to exhibit sufficient electrode reaction. Therefore, it is preferable to determine an appropriate content within the above range.

Among the base solid materials constituting the positive electrode of the present invention, the electrically conductive material is a material that electrically connects an electrolyte to a positive electrode active material and serves as a path through which electrons move from the current collector to the sulfur, and is not particularly limited as long as it has porosity and conductivity without causing chemical changes in the battery. For example, graphite-based materials such as KS6; carbon blacks such as Super P, carbon black, Denka black, acetylene black, Ketjen black, channel black, furnace black, lamp black, and thermal black; carbon derivatives such as fullerene; electrically conductive fibers such as carbon fiber and metal fiber; carbon fluoride metal powders such as aluminum and nickel powder; or electrically conductive polymers such as polyaniline, polythiofene, polyacetylene, and polypyrrole are used alone or in combination.

The electrically conductive material may be preferably used in an amount of 1 to 10 parts by weight, preferably about 5 parts by weight, based on 100 parts by weight of base solid materials. If the content of the electrically conductive material contained in the electrode is less than the above range, the unreacted portion of the sulfur in the electrode is increased and eventually the capacity is reduced. If the content exceeds the above range, the high efficiency discharging characteristic and the charging/discharging cycle life are adversely affected. Therefore, it is desirable to determine the appropriate content within the above-mentioned range.

The binder as a base solid material is a material that is comprised to cause a slurry composition of the base solid material that forms a positive electrode to adhere well to the current collector, which is a substance which is well dissolved in a solvent and which can constitute an electrically conductive network between a positive electrode active material and an electrically conductive material. Unless otherwise specified, all binders known in the art can be used, and preferably poly(vinyl)acetate, polyvinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride (PVdF), polyhexafluoropropylene, copolymer(product name: Kynar) of polyvinylidene fluoride, poly(ethyl acrylate), polyvinylchloride, polytetrafluoroethylene, polyacrylonitrile, polyvinylpyridine, polystyrene, carboxy methyl cellulose, siloxane-based binder such as polydimethylsiloxane, rubber-based binder comprising styrene-butadiene rubber, acrylonitrile-butadiene rubber and styrene-isoprene rubber, ethyleneglycol-based binder such as polyethylene glycol diacrylate and derivatives thereof, blends thereof, and copolymers thereof may be used, but the present invention is not limited thereto.

The binder may be used in an amount of 1 to 10 parts by weight, preferably about 5 parts by weight, based on 100 parts by weight of the base composition contained in the electrode. If the content of the binder resin is less than the above range, the physical properties of the positive electrode are degraded, and thus the positive electrode active material and the electrically conductive material can be dropped off. If the content of the binder resin exceeds the above range, the ratio of the active material and the electrically conductive material in the positive electrode may be relatively decreased, thereby reducing the battery capacity. Therefore, it is preferable that the content of the binder resin is determined from the appropriate content within the above-mentioned range.

As described above, the positive electrode comprising the iron oxide and base solid materials can be prepared by conventional methods. For example, to a positive electrode active material, a solvent, and if necessary, a binder, an electrically conductive material, and a dispersant were mixed and stirred to prepare a slurry. Then, the prepared slurry can be applied (coated) on a current collector of a metal material, compressed, and then dried to produce a positive electrode.

For example, in preparing the positive electrode slurry, first, after the iron oxide is dispersed in a solvent, the obtained solution is mixed with an active material, an electrically conductive material, and a binder to obtain a slurry composition for forming a positive electrode. Thereafter, this slurry composition is coated on a current collector and dried to complete a positive electrode. At this time, if necessary, the electrode can be manufactured by compression-molding on the current collector to improve the density of the electrode. There are no limitations on the method of coating the slurry. For example, it is possible to use a coating method such as doctor blade coating, dip coating, gravure coating, slit die coating, spin coating, comma coating, bar coating, reverse roll coating, screen coating, cap coating and the like.

At this time, a solvent capable of not only uniformly dispersing a positive electrode active material, a binder and an electrically conductive material but also easily dispersing the iron oxide can be used as the solvent. As such a solvent, water is most preferable as an aqueous solvent, and the water may be double distilled water (DW) or triple distilled deionized water (DIW), but is not necessarily limited thereto, and if necessary, a lower alcohol which can be easily mixed with water may be used. Examples of the lower alcohol comprise methanol, ethanol, propanol, isopropanol, and butanol, and they may be preferably used in mixture with water.

In one embodiment, the positive electrode comprises a current collector and an electrode active material layer formed on at least one side of the current collector, the electrode active material layer comprises an active material, an electrically conductive material, and a binder, and the porosity of the electrode active material layer may be 60 to 75%, specifically 60 to 70%, preferably 65 to 70%.

In the present invention, the term "porosity" means the ratio of the volume occupied by the pores to the total volume in a structure, and its unit is %.

In the present invention, the measurement of the porosity is not particularly limited. For example, according to one embodiment of the present invention, the micro and meso pore volume can be measured by, for example, a Brunauer-Emmett-Teller (BET) measurement method or a Hg porosimeter.

If the porosity of the electrode active material layer is less than 60%, the degree of filling of the base solid material comprising the active material, the electrically conductive material, and the binder becomes excessively high, so that a sufficient electrolyte solution capable of exhibiting ion conduction and/or electric conduction cannot be maintained between the active materials, and thus the output characteristics and the cycle characteristics of the battery may be deteriorated, and also the overvoltage of the battery is severe and the discharge capacity is greatly reduced, and thus, there is a problem that the effect generated by comprising the iron oxide according to the present invention may not be properly manifested. If the porosity is over 75% and thus is too high, there are problems that the physical and electrical connection with the current collector is lowered and the adhesive force is lowered and the reaction becomes difficult and that the energy density of the battery may be lowered because the pores due to the increased porosity are filled with the electrolyte. Therefore, the porosity is appropriately controlled within the above range. According to an embodiment of the present invention, the porosity may be performed by a method selected from the group consisting of a hot press method, a roll press method, a plate press method, and a roll laminate method.

Lithium Secondary Battery

Meanwhile, the present invention provides a lithium secondary battery comprising a positive electrode, a negative electrode, a separator interposed therebetween, and an electrolyte, wherein the positive electrode is a positive electrode as described above.

At this time, the negative electrode, separator, and electrolyte may be made of conventional materials that can be used in a lithium secondary battery.

Specifically, the negative electrode may comprise a material capable of reversibly intercalating or deintercalating lithium ion ($Li^+$), a material capable of reacting with lithium ion to reversibly form a lithium-containing compound, lithium metal, or a lithium alloy as an active material.

The material capable of reversibly intercalating or deintercalating lithium ion ($Li^+$) may be, for example, crystalline carbon, amorphous carbon, or mixtures thereof. In addition, the material capable of reacting with lithium ion ($Li^+$) to reversibly form the lithium-containing compound may be, for example, tin oxide, titanium nitrate or silicon. In addition, the lithium alloy may be, for example, an alloy of lithium and the metal selected from the group consisting of Na, K, Rb, Cs, Fr, Be, Mg, Ca, Sr, Ba, Ra, Al, and Sn.

In addition, the negative electrode may further optionally comprise a binder together with a negative electrode active material. The binder acts to cause negative electrode active materials to become a paste and create mutual adhesion between the active materials, adhesion between the active materials and the current collector, and buffer effect for the expansion and contraction of the active materials, etc. Specifically, the binder is the same as that described above.

In addition, the negative electrode may further comprise a current collector for supporting a negative electrode active layer comprising a negative electrode active material and a binder. The current collector may be selected from the group consisting of copper, aluminum, stainless steel, titanium, silver, palladium, nickel, alloys thereof, and combinations thereof. The stainless steel may be surface-treated with carbon, nickel, titanium, or silver, and an aluminum-cadmium alloy may be used as the alloy. In addition, sintered carbon, a nonconductive polymer surface-treated with an electrically conductive material, or a conductive polymer may be used.

In addition, the negative electrode may be a thin film of lithium metal.

As the separator, a material capable of separating or insulating the positive electrode and the negative electrode from each other while allowing the lithium ion to be transported therebetween is used. The separator can be used as a separator without any particular limitations as long as it is used as a separator in the lithium secondary battery. Particularly, it is desirable to use a separator having excellent wettability to the electrolyte while having low resistance to ion migration of the electrolyte.

More preferably, as the material for the separator, a porous, nonconductive or insulating material can be used, and for example, the separator may be an independent member such as a film, or may comprise a coating layer added to the positive and/or negative electrodes.

Specifically, a porous polymer film, for example, a porous polymer film made of a polyolefin-based polymer such as ethylene homopolymer, propylene homopolymer, ethylene/butene copolymer, ethylene/hexene copolymer and ethylene/methacrylate copolymer, etc. may be used alone or in a laminate thereof, or a conventional porous nonwoven fabric, for example, a nonwoven fabric made of glass fiber, polyethylene terephthalate fiber or the like with high melting point can be used, but are not limited thereto.

The electrolyte is a non-aqueous electrolyte containing lithium salt and is composed of lithium salt and an electrolyte solution, and as the electrolyte solution, non-aqueous organic solvent, organic solid electrolyte, and inorganic solid electrolyte are used.

The lithium salt is a substance which can be easily dissolved in a non-aqueous organic solvent, and for example, may be at least one selected from the group consisting of LiCl, LiBr, LiI, $LiClO_4$, $LiBF_4$, $LiB_{10}Cl_{10}$, $LiB(Ph)_4$, $LiPF_6$, $LiCF_3SO_3$, $LiCF_3CO_2$, $LiAsF_6$, $LiSbF_6$, $LiAlCl_4$, $LiSO_3CH_3$, $LiSO_3CF_3$, LiSCN, $LiC(CF_3SO_2)_3$, $LiN(CF_3SO_2)_2$, lithium chloroborane, lithium lower aliphatic carboxylate, and lithium imide.

The concentration of the lithium salt may be 0.2 to 2 M, preferably 0.6 to 2 M, more preferably 0.7 to 1.7 M depending on various factors such as the exact composition of the electrolyte mixture, the solubility of the salt, the conductivity of the dissolved salt, the charge and discharge conditions of the battery, the operating temperature and other factors known in the lithium battery field. If the concentration of the lithium salt is less than the above range, the conductivity of the electrolyte may be lowered and thus the performance of the electrolyte may be deteriorated. If the concentration of the lithium salt exceeds the above range, the viscosity of the electrolyte may increase and thus the mobility of the lithium ion ($Li^+$) may be reduced. Accordingly, it is preferable to select an appropriate concentration of the lithium salt within the above range.

The non-aqueous organic solvent is a substance capable of dissolving a lithium salt well, and preferably, aprotic organic solvents such as 1,2-dimethoxyethane, 1,2-diethoxyethane, 1,2-dibutoxyethane, dioxolane (DOL), 1,4-dioxane, tetrahydrofuran, 2-methyltetrahydrofuran, dimethylcarbonate (DMC), diethylcarbonate (DEC), ethylmethylcarbonate (EMC), methylpropylcarbonate (MPC), ethylpropylcarbonate, dipropylcarbonate, butylethylcarbonate, ethylpropanoate (EP), toluene, xylene, dimethyl ether (DME), diethylether, triethylene glycol monomethyl ether (TEGME), diglyme, tetraglyme, hexamethyl phosphoric triamide, gamma-butyrolactone (GBL), acetonitrile, propionitrile, ethylenecarbonate (EC), propylenecarbonate (PC), N-methylpyrrolidone, 3-methyl-2-oxazolidone, acetic acid ester, butyric acid ester and propionic acid ester, dimethyl formamide, sulfolane (SL), methyl sulfolane, dimethyl acetamide, dimethyl sulfoxide, dimethyl sulfate, ethyleneglycol di-acetate, dimethyl sulfite, or ethyleneglycol sulfite can be used alone or in a mixed solvent form of two or more solvents thereof.

As the organic solid electrolyte, preferably, polyethylene derivatives, polyethylene oxide derivatives, polypropylene oxide derivatives, phosphate ester polymers, poly alginate lysine, polyester sulfide, polyvinyl alcohol, polyvinylidene fluoride, and polymers comprising ionic dissociation groups and the like can be used.

As the inorganic solid electrolyte of the present invention, preferably, nitrides, halides, sulfates and the like of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$ may be preferably used.

The shape of the lithium secondary battery as described above is not particularly limited and may be, for example, a jelly-roll type, a stack type, a stack-folding type (including a stack-Z-folding type), or a lamination-stacking type, and preferably a stack-folding type.

An electrode assembly in which the positive electrode as described above, the separator, and the negative electrode are successively laminated is manufactured and then placed it in a battery case. Thereafter, a lithium secondary battery is manufactured by injecting an electrolyte solution into the upper part of the case and sealing it with a cap plate and a gasket.

The lithium secondary battery may be classified into a cylindrical shape, a square shape, a coin shape, a pouch shape, and the like depending on the shape, and may be divided into a bulk type and a thin film type depending on the size. The structure and manufacturing method of these batteries are well known in the art, and thus detailed description thereof will be omitted.

The lithium secondary battery according to the present invention constituted as described above comprises the iron oxide to adsorb the lithium polysulfide generated during charging and discharging of the lithium secondary battery, thereby increasing the reactivity of the positive electrode of the lithium secondary battery, and increasing the discharging capacity and lifetime of the lithium secondary battery.

Hereinafter, the present invention will be described in more detail with reference to Examples and the like. However, the scope and content of the present invention cannot be construed as narrowing down or limiting the invention by Examples and the like. Also, it will be apparent on the basis of the disclosures of the present invention, comprising the following Examples that the present invention, in which experimental results are not specifically shown, can be easily carried out by those skilled in the art and that such modifications and variations are intended to fall within the scope of the appended claims.

EXAMPLES

Preparation Example 1: Preparation of Iron Oxide (1)

$Fe(NO_3)_3 \cdot 9H_2O$ (Sigma-Aldrich Company) was dissolved in deionized water (DIW) to prepare a 2.0 M aqueous solution. The prepared aqueous solution was dried at 80° C. for 6 hours in a convection oven while sufficiently introducing air. Thereafter, the heat treatment was performed at 155° C. for 18 hours in a convection oven while sufficiently introducing air to prepare an iron oxide represented by $Fe_{1.766}O_3$.

Preparation Example 2: Preparation of Iron Oxide (1)

An iron oxide was prepared in the same manner as in Preparation Example 1 except that the heat treatment time was 24 hours Example 1: Manufacture of Lithium Secondary Battery Comprising Positive Electrode to which Iron Oxide was Added (1)

First, on the basis of the total weight (100 parts by weight) of the base solid material (the active material, the electrically conductive material, and the binder) to which the iron oxide is added, 10 parts by weight of the iron oxide prepared in Preparation Example 1 was added and dissolved in water as a solvent. Thereafter, 100 parts by weight of the base solid material relative to the obtained solution, that is, 90 parts by weight of sulfur-carbon composite (S/C 8:2 parts by weight) as an active material, 5 parts by weight of Denka black as an electrically conductive material, and 5 parts by weight of styrene butadiene rubber/carboxymethyl cellulose (SBR/CMC 7:3) as a binder were added and mixed to prepare a slurry composition for positive electrode.

Subsequently, the slurry composition prepared above was coated on a current collector (Al foil), dried at 50° C. for 12 hours, and pressed with a roll press machine to produce a positive electrode. At this time, the loading amount was set to 3.5 mAh/cm$^2$, and the porosity of the electrode was set to 65%.

Thereafter, a coin cell of the lithium secondary battery comprising the positive electrode prepared as described above, a negative electrode, a separator, and an electrolyte solution was manufactured as follows. Specifically, the positive electrode was fabricated by punching into a 14-phi circular electrode, the polyethylene (PE) separator was fabricated by punching into a separator of 19 phi and the negative electrode was fabricated by punching lithium metal of 150 μm into 16 phi.

Example 2: Manufacture of Lithium Secondary Battery Comprising Positive Electrode to which Iron Oxide was Added (3)

A battery was manufactured in the same manner as in Example 1, except that 10 parts by weight of the iron oxide prepared in Preparation Example 2 was added.

Comparative Example 1: Manufacture of Lithium Secondary Battery Comprising Positive Electrode to which Iron Oxide was not Added (1)

To water as a solvent, 100 parts by weight of the base solid material, that is, 90 parts by weight of the sulfur-carbon composite (S/C 7:3 parts by weight) as an active material, 5 parts by weight of Denka black as an electrically conductive material, and 5 parts by weight of styrene butadiene rubber/carboxymethyl cellulose (SBR/CMC 7:3) as a binder were added and mixed to prepare a slurry composition for positive electrode.

Subsequently, the slurry composition prepared above was coated on a current collector (Al foil), dried at 50° C. for 12 hours to produce a positive electrode. At this time, the loading amount was set to 3.5 mAh/cm², and the porosity of the electrode was set to 60%.

Thereafter, a coin cell of the lithium secondary battery comprising the positive electrode prepared as described above, a negative electrode, a separator, and an electrolyte solution was manufactured as follows. Specifically, the positive electrode was fabricated by punching into a 14-phi circular electrode, the polyethylene (PE) separator was fabricated by punching into a separator of 19 phi and the negative electrode was fabricated by punching lithium metal of 150 μm into 16 phi.

Comparative Example 2: Manufacture of Lithium Secondary Battery Comprising Positive Electrode to which Iron Oxide was not Added (2)

A battery was prepared in the same manner as in Comparative Example 1, except that the ratio of sulfur and carbon in the sulfur-carbon composite was 8:2 parts by weight.

Experimental Example 1: Scanning Electron Microscope (SEM) Analysis

SEM analysis (S-4800 FE-SEM from Hitachi Company) was performed on $Fe_{1.766}O_3$, which is the iron oxide produced in Production Examples 1 and 2, respectively. FIG. 1 shows the results of SEM analysis of $Fe_{1.766}O_3$ prepared in Preparation Example 1, and FIG. 2 is a graph showing the results of SEM analysis of the iron oxide prepared in Preparation Example 2.

Referring to FIGS. 1 and 2, it was confirmed that as a result of SEM analysis at a magnification of 100 k, the particles having a particle diameter of several tens nm were agglomerated to form secondary particles having a particle size of 1 to 5 μm.

Experimental Example 2: X-Ray Diffraction (XRD) Analysis

XRD analysis (D4 Endeavor from Bruker Company) was performed on $Fe_{1.766}O_3$, which is the iron oxide produced in Preparation Examples 1 and 2, respectively.

FIG. 3 shows the results of XRD analysis of $Fe_{1.766}O_3$ prepared in Preparation Example 1, and FIG. 4 is a graph showing the results of XRD analysis of the iron oxide prepared in Preparation Example 2.

Referring to FIGS. 3 and 4, it was confirmed that $Fe_{1.766}O_3$ containing a large amount of oxygen as compared to stable phase $Fe_2O_3$ was prepared, and it was found by confirming the XRD peaks in Example that pure phase iron oxide ($Fe_{1.766}O_3$) was selectively prepared.

Experimental Example 3: Experiment of Adsorption Capacity of Iron Oxide on Lithium Polysulfide The adsorption capacities of $Fe_{1.766}O_3$ according to Preparation Examples 1 and 2 and carbon nanotubes (CNT) on the lithium polysulfide were confirmed by analyzing the absorbance by ultraviolet ray (UV, Agilent 8453 UV-visible spectrophotometer from Agilent Company), and the results are shown in FIG. 5.

Figure 5:
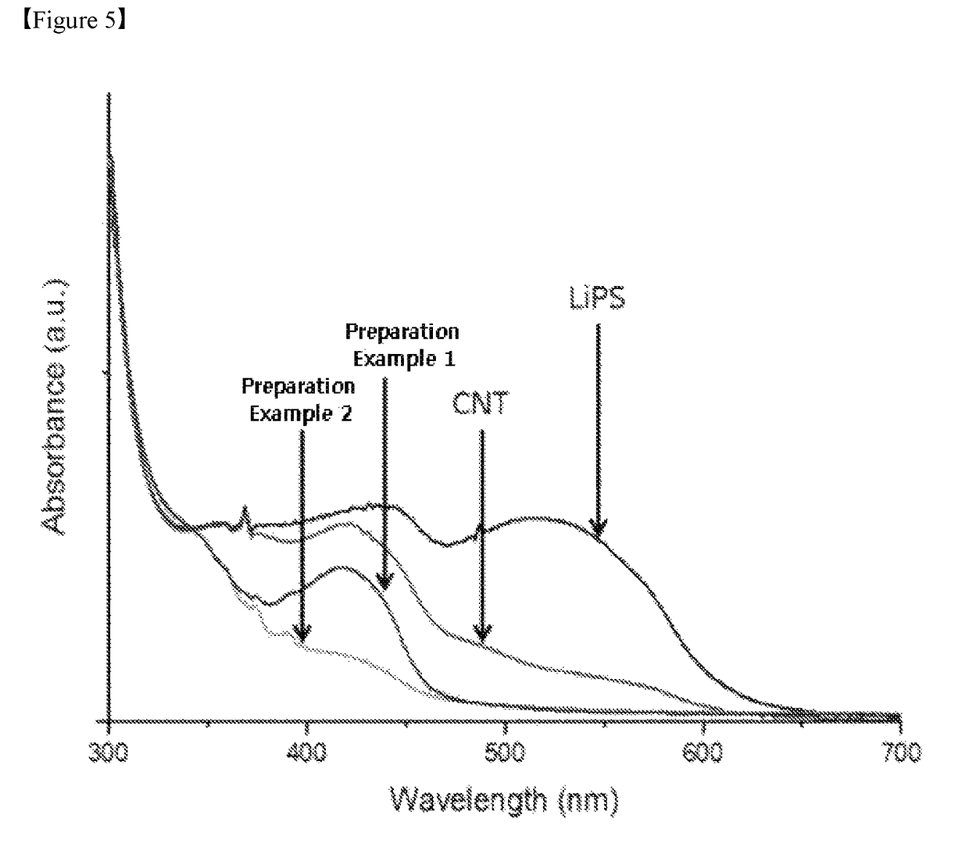
FIG. 5 shows the change in chromaticity of the adsorption reaction of lithium polysulfide according to Preparation Examples of the present invention and Comparative Examples as a result of measurement of UV absorbance.

As shown in FIG. 5, it was confirmed that the intensity of ultraviolet absorbance in the wavelength range of 300 to 700 nm was reduced as a result of adsorption of the lithium polysulfide by iron oxide $Fe_{1.766}O_3$ according to the present invention and CNT, and it was found that the iron oxides of Preparation Examples 1 and 2 were more excellent in adsorption ability to the lithium polysulfide, as compared to CNT.

Experimental Example 4: Comparison Test of Discharging Capacity of Lithium Secondary Battery In order to test the discharging capacity of the lithium secondary battery depending on the type of the positive electrode material, the discharging capacities were measured after constructing the positive electrodes and the negative electrodes for lithium secondary batteries as shown in Table 1 below.

The positive electrode of Comparative Example 1 was set to contain the sulfur-carbon composite (S/C 7:3 weight ratio), the positive electrode of Comparative Example 2 was set to contain the sulfur-carbon composite (S/C 8:2 weight ratio), the positive electrode of Example 1 was set to contain the sulfur-carbon composite (S/C 8:2 weight ratio) and $Fe_{1.766}O_3$ of Preparation Example 1, the positive electrode of Example 2 was set to contain the sulfur-carbon composite (S/C 8:2 weight ratio), and $Fe_{1.766}O_3$ of Preparation Example 2. At this time, the measurement current was 0.1 C, the voltage range was 1.8 to 2.8 V, and the results are shown in FIG. 6.

TABLE 1

| | Lithium secondary battery | |
| --- | --- | --- |
| | Negative electrode | Positive electrode |
| Comparative Example 1 | metal lithium | sulfur-carbon composite (S/C 7:3) + electrically conductive material + binder (90:5:5, weight ratio) |
| Comparative Example 2 | metal lithium | sulfur-carbon composite (S/C 8:2) + electrically conductive material + binder (90:5:5, weight ratio) |
| Example 1 | metal lithium | sulfur-carbon composite (S/C 8:2) + electrically conductive material + binder + iron oxide of Preparation Example 1 (10 parts by weight) (90:5:5:10, weight ratio) |
| Example 2 | metal lithium | sulfur-carbon composite (S/C 8:2) + electrically conductive material + binder + iron oxide of Preparation Example 2 (10 parts by weight) (90:5:5:10, weight ratio) |

Figure 6:
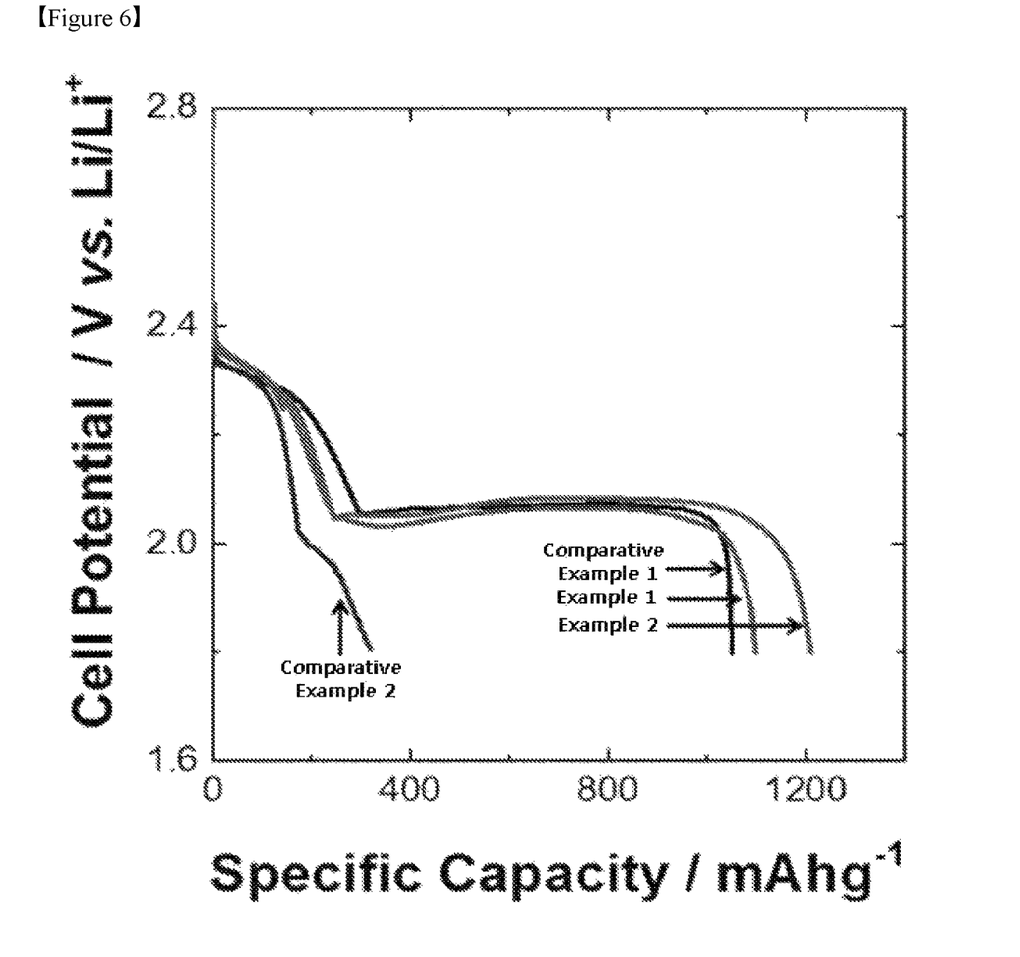
FIG. 6 shows the results of measurement of the initial discharging capacity of the lithium secondary batteries comprising the positive electrodes according to Examples of the present invention and Comparative Examples.

As shown in FIG. 6, it can be seen that Examples 1 and 2, to which $Fe_{1.766}O_3$ was added, had higher initial discharging capacity than Comparative Examples 1 and 2, and it was confirmed that the initial discharging capacity of Example 2 containing the iron oxide according to Preparation Example 2 was further increased as compared with that of Example 1. Especially, in the case of Comparative Example 2 using a sulfur-carbon composite with a sulfur content of 80 parts by weight, the content of sulfur, which is an insulator, was increased as compared with Comparative Example 1, and initial discharging was not properly performed. As a result, a large overvoltage occurred and the discharging capacity of the battery was drastically reduced. However, in the case of containing iron oxide according to the present invention, it was confirmed that the discharging capacity was increased even though sulfur-carbon composite having a sulfur content of 80 parts by weight was used. Therefore, it was found that the iron oxide according to the present invention is effective in increasing the initial discharging capacity of the lithium secondary battery.

The invention claimed is:

1. A positive electrode for a lithium secondary battery comprising:
an active material;
an electrically conductive material;
a binder; and
an iron oxide represented by the following Formula 1:

$$Fe_xO_3 \text{ wherein } 1.7 \leq x < 1.8, \text{ and} \quad \text{[Formula 1]}$$

wherein the iron oxide is $Fe_{1.766}O_3$, and
wherein the iron oxide has X-ray diffraction (XI)) peaks appearing at 2θ=24.2±0.1°, 33.8±0.1°, 36.0±0.1°, 40.8±0.1°, 49.4±0.1°, and 53.8±0.1°, respectively.

2. The positive electrode for the lithium secondary battery according to claim 1, wherein a content of the iron oxide is 0.1 parts by weight to 15 parts by weight based on 100 parts by weight of base solid material comprising the active material, the electrically conductive material and the binder, contained in the positive electrode of the lithium secondary battery.

3. The positive electrode for the lithium secondary battery according to claim 1, wherein the iron oxide is in the form of secondary particles formed by agglomeration of primary particles.

4. The positive electrode for the lithium secondary battery according to claim 3, wherein the primary particles have a particle diameter of 10 nm to 80 nm.

5. The positive electrode for the lithium secondary battery according to claim 3, wherein the secondary particles have a particle diameter of 1 μm to 5 μm.

6. The positive electrode for the lithium secondary battery according to claim 1, wherein the iron oxide is crystalline.

7. The positive electrode for the lithium secondary battery according to claim 1, wherein the active material comprises a sulfur-carbon composite.

8. The positive electrode for the lithium secondary battery according to claim 7, wherein the sulfur-carbon composite has a sulfur content of 60 parts by weight to 90 parts by weight based on 100 parts by weight of the sulfur-carbon composite.

9. The positive electrode for the lithium secondary battery according to claim 1, wherein the positive electrode comprises a current collector and an electrode active material layer formed on at least one side of the current collector, wherein the electrode active material layer comprises the active material, the electrically conductive material, the binder, and the iron oxide, and a porosity of the electrode active material layer is 60% to 75%.

10. A lithium secondary battery comprising a positive electrode, a negative electrode, a separator interposed therebetween, and an electrolyte, wherein the positive electrode is the positive electrode for the lithium secondary battery according to claim 1.

11. The lithium secondary battery according to claim 10, wherein the positive electrode comprises sulfur.

* * * * *